(12) United States Patent
Scholemann et al.

(10) Patent No.: US 11,091,014 B2
(45) Date of Patent: Aug. 17, 2021

(54) HOUSING ASSEMBLY FOR ELECTRICAL STORAGE

(71) Applicant: Muhr und Bender KG, Attendorn (DE)

(72) Inventors: Björn Scholemann, Drolshagen (DE); Daniel Mauser, Finnentrop (DE); Elisabeth Danger, Paderborn (DE)

(73) Assignee: Muhr und Bender KG, Attendorn (DE)

( * ) Notice: Subject to any disclaimer, the term of this patent is extended or adjusted under 35 U.S.C. 154(b) by 147 days.

(21) Appl. No.: 16/295,119

(22) Filed: Mar. 7, 2019

(65) Prior Publication Data

US 2019/0283562 A1    Sep. 19, 2019

(30) Foreign Application Priority Data

Mar. 19, 2018 (DE) .................... 10 2018 106 399.7

(51) Int. Cl.
*B60L 50/60* (2019.01)
*B60K 1/04* (2019.01)
*H01M 50/20* (2021.01)
*H01M 50/24* (2021.01)
*H01M 50/258* (2021.01)

(52) U.S. Cl.
CPC ............... *B60K 1/04* (2013.01); *B60L 50/66* (2019.02); *H01M 50/20* (2021.01); *H01M 50/24* (2021.01); *H01M 50/258* (2021.01); *B60K 2001/0438* (2013.01); *H01M 2220/20* (2013.01)

(58) Field of Classification Search
CPC .................... B60K 2001/0438; B60L 50/66
See application file for complete search history.

(56) References Cited

U.S. PATENT DOCUMENTS

| | | | | |
|---|---|---|---|---|
| 5,501,289 | A * | 3/1996 | Nishikawa | B62D 21/10 180/68.5 |
| 7,997,368 | B2 * | 8/2011 | Takasaki | H01M 2/1072 180/68.5 |
| 8,980,458 | B2 * | 3/2015 | Honjo | B60K 1/04 429/100 |
| 9,227,582 | B2 * | 1/2016 | Katayama | B60L 1/003 |

(Continued)

FOREIGN PATENT DOCUMENTS

DE          102 46 164 A1    4/2004
DE    10 2014 226 566 B3    4/2016

(Continued)

*Primary Examiner* — Jeffrey J Restifo
(74) *Attorney, Agent, or Firm* — Bejin Bieneman PLC (57) ABSTRACT

A housing assembly for electrical storage means for a drive of an electrically powered motor vehicle comprises a tray arrangement, into which electrical storage means can be inserted, and a cover arrangement, which can be placed on the tray arrangement and can be releasably connected thereto, wherein the tray arrangement and/or the cover arrangement has a first formed part and a second formed part, each having a base and side walls; said first formed part and said second formed part being arranged adjacent to each other and joined together in a longitudinally extending joining region; said first formed part and said second formed part each being made of flexibly rolled steel sheet so as to have a variable sheet thickness in the longitudinal direction of the respective formed part.

13 Claims, 6 Drawing Sheets

(56) References Cited

U.S. PATENT DOCUMENTS

| | | | |
|---|---|---|---|
| 9,254,609 B2* | 2/2016 | Choi | B60L 50/66 |
| 9,873,456 B2* | 1/2018 | Hara | B62D 25/2072 |
| 10,017,037 B2* | 7/2018 | Newman | B60L 50/64 |
| 10,207,573 B2* | 2/2019 | Hara | B62D 25/20 |
| 10,336,211 B2* | 7/2019 | Kobayashi | H01M 2/1083 |
| 10,377,216 B2* | 8/2019 | Hitz | B62D 25/20 |
| 10,381,621 B2* | 8/2019 | Maguire | H01M 2/1083 |
| 10,431,791 B2* | 10/2019 | Lomax | B60K 1/04 |
| 10,464,406 B2* | 11/2019 | Kawabe | B60K 1/04 |
| 10,486,746 B2* | 11/2019 | Kawabe | B60L 50/66 |
| 10,549,619 B2* | 2/2020 | Nakayama | H01M 2/1083 |
| 10,559,793 B2* | 2/2020 | Smith | B60K 1/04 |
| 10,647,213 B2* | 5/2020 | Otoguro | B60L 50/64 |
| 10,700,320 B2* | 6/2020 | Kosaki | B60K 1/04 |
| 10,703,188 B2* | 7/2020 | Watanabe | B60K 1/04 |
| 10,741,809 B2* | 8/2020 | Kim | B60K 1/04 |
| 10,759,262 B2* | 9/2020 | Goto | B60L 50/66 |
| 10,822,039 B2* | 11/2020 | Shannon | B62D 25/2036 |
| 10,829,156 B2* | 11/2020 | Otoguro | B62D 21/03 |
| 10,843,577 B2* | 11/2020 | Gunther | B60L 50/64 |
| 10,847,771 B2* | 11/2020 | Goitsuka | B60L 50/66 |
| 2009/0325049 A1* | 12/2009 | Niedzwiecki | H01M 2/0245 |
| | | | 429/100 |
| 2012/0301765 A1* | 11/2012 | Loo | H01M 2/1083 |
| | | | 429/100 |
| 2013/0075173 A1* | 3/2013 | Kato | H01M 2/1083 |
| | | | 180/68.5 |
| 2013/0127200 A1* | 5/2013 | Saeki | B60K 1/04 |
| | | | 296/37.14 |
| 2014/0117716 A1* | 5/2014 | Patberg | B62D 1/04 |
| | | | 296/187.08 |
| 2014/0284125 A1* | 9/2014 | Katayama | B60L 3/0069 |
| | | | 180/68.5 |
| 2015/0249240 A1* | 9/2015 | Hihara | H01M 2/10 |
| | | | 180/68.5 |
| 2015/0255764 A1* | 9/2015 | Loo | B60K 1/04 |
| | | | 429/149 |
| 2017/0018747 A1* | 1/2017 | Yamada | H01M 10/613 |
| 2017/0225558 A1* | 8/2017 | Newman | H01M 2/1083 |

FOREIGN PATENT DOCUMENTS

| | | |
|---|---|---|
| DE | 10 2016 108 849 B3 | 4/2017 |
| WO | 2015018618 A1 | 2/2015 |

* cited by examiner

HOUSING ASSEMBLY FOR ELECTRICAL STORAGE

CROSS-REFERENCE TO RELATED APPLICATIONS

This application is a national stage of, and claims priority to, German Application No. DE 10 2018 106 399.7, filed on Mar. 19, 2018, which application is hereby incorporated herein by reference in its entirety.

BACKGROUND

An electric vehicle includes, among other things, an electric machine as a drive source that is electrically connected to electrical storage means. In drive mode, the electrical machine converts electrical energy into mechanical energy to drive the vehicle. The electrical storage means, which can also be referred to as electrical storage devices, batteries, or accumulators, are usually accommodated in a battery housing attached with the vehicle body at the underside of the vehicle.

From the US 2009/0325049 A1, a mounting system for a plurality of battery modules is known. The mounting system comprises a base plate and a cover which can be detachably connected by means of screws. The base plate is flat and made of steel material. The cover has an inner recess which is adapted to the battery modules to be accommodated. Two elongated sections arranged one behind the other are provided, which are separated from each other by a gap in an upper area, as well as a section running transversely to the elongated sections. The cover is made of a thermoplastic or fibre-reinforced composites.

From DE 10 2016 108 849 B3 a battery holder for a motor vehicle is known, which has a base plate, a circumferential side frame and a cover. The base plate and the frame are one-piece and tray-shaped made of a three-layer laminated composite steel as a sheet metal forming component. An inner layer is made of an acid-resistant steel alloy and an outer layer is made of a stainless steel alloy.

From DE 10 2014 226 566 B3 a battery case for a traction battery of an electrically operated vehicle is known. The battery case comprises side walls, which are composed of a strut construction.

From DE 102 46 164 A1 a method for producing quenched and tempered structural components is known. A metal strip is produced by flexible rolling in such a way that over the length of the metal strip sections with different strip thicknesses are obtained. Blanks are then separated from the metal strip and hot formed.

DESCRIPTION

The present disclosure relates to a housing assembly for receiving electrical storage means for an electric motor-driven motor vehicle and a method of manufacturing such a housing assembly.

The housing assembly can accommodate electrical storage means for an electric driven motor vehicle, which housing is lightweight, has good sealing properties and can be manufactured easily and inexpensively. Also disclosed is a method for producing such a housing assembly.

A housing assembly for housing electrical storage means for an electric drive of an electrically drivable motor vehicle, comprise: a tray arrangement for receiving electrical storage means, and a cover arrangement which is releasably connectable to the tray arrangement; wherein at least one of the tray arrangement and the cover arrangement comprises a first formed part and a second formed part each having a bottom and side walls; wherein the first and second formed part are each made of flexibly rolled metal material and have a variable sheet thickness in a longitudinal direction of the respective formed part, in particular with a length in a longitudinal direction of the respective formed part being greater than a width; and wherein the first and second formed parts are arranged adjacent to each other and joined to each other in a joining region extending in the longitudinal direction.

An advantage is that individual parts of the tray and/or cover arrangement can be individually adapted to the strength and stiffness requirements in terms of material thickness over the length of the respective part. The dimensioning of the individual portions, i.e., sections of the formed parts, can be carried out individually depending on the expected loads. By selectively reducing the thickness of the formed parts in less stressed areas, material can be saved, so that the housing assembly ultimately has a low weight with no loss of mechanical properties and can therefore be manufactured cost-effectively. By specifically increasing the thickness of the formed parts in areas subject to higher loads, especially in crash-relevant areas, higher strength can be achieved so that the housing assembly can support a high load without being destroyed. The base and the side walls of the respective formed part are preferably designed in one piece. This leads to an integral tray shape that is dense in itself. The leakage of battery fluid from the formed part or the penetration of dirt into the formed part is effectively prevented. The one-piece tray shaped part is produced from a blank as the starting product, for example by a forming process of the blank, or by cutting, bending and welding operations of the blank. The tray arrangement has, advantageously, a self-contained, sealed and self-supporting structure with high rigidity and strength.

In the context of this disclosure, the term "formed part" includes any metallic component which is formed from a flat metal product such as a sheet metal blank into a three-dimensional element. The tray arrangement and/or the cover arrangement can each be composed of several formed parts, which can also be referred to as tray parts or cover parts. However, it is also possible that only one of the arrangements (tray or cover arrangement) is composed of several interconnected formed parts, while the other arrangement (cover or tray arrangement) consists of only one formed part. The production of the formed parts can be carried out according to a first possibility in such a way that they are first produced separately, including the forming process, and subsequently joined together. Alternatively, it is also possible that the flat steel products are first joined together and then formed jointly to form the two formed parts.

The formed parts may be made of any technically suitable metal, in particular as a flat steel product, such as high strength, ultra high strength or ultra high strength steels such as dual phase, complex phase, TRIP steels, for example, or of hardenable steels such as boron alloyed quenched and tempered steels. It is also possible to use light metals such as aluminium or aluminium alloys as flat products.

To achieve a particularly high strength of the housing assembly, it is advantageous if at least some of the formed parts are hardened. A hardened formed part is understood according to the present disclosure to be a metallic component which is produced from a hardenable steel material and has been formed by a forming operation and simultaneously or subsequently hardened at least in partial regions, preferably completely. After hardening, the component has a higher strength than before hardening. Forming and hardening can be carried out in particular by hot forming. For example, manganese-boron alloyed heat-treatable steels such as 17MnB3, 22MnB5, 26MnB5 or 34MnB5 can be used. The starting material (strip material) shall preferably have a tensile strength of at least 500 MPa. The finished hardened and formed part may have a final tensile strength of at least 1100 MPa, preferably at least 1300 MPa, particularly preferably even more than 1500 MPa at least in some areas.

According to a possible embodiment, end sections of the first and/or second formed part may have a greater sheet thickness than at least one intermediate section of the respective formed part lying between the end sections. The end sections, respective intermediate section, can also be referred to as end portion, respective intermediate portion. The greater sheet thickness in the end sections achieves a high strength, so that forces can be absorbed and supported in these areas, which can, for example, act on the housing assembly due to a possible accident. The end sections with greater sheet thickness can have a length of 20 mm to 200 mm without being restricted to this. The sheet thickness in the end sections, for example, can be between 1.0 mm and 3.5 mm, in particular between 1.5 and 2.0 mm. Between the end sections one or more sections with smaller sheet thickness can be provided. These can have a sheet thickness of 0.5 mm to 1.5 mm. It goes without saying that the thickness values given are exemplary and depend on the steel material used and the technical strength requirements.

For particularly high stability of the housing assembly, it may be provided that the first formed part and/or the second formed part has between the end sections of the respective formed part at least one reinforcing section with a greater sheet thickness than the adjacent intermediate sections. For example, depending on the desired stiffness, the formed parts can have one, two, three or more reinforcement sections with greater sheet thickness. The thickened reinforcement sections extend parallel to each other, respectively parallel to the thickened end sections. A transition section with variable sheet thickness is provided in each case between a section with greater sheet thickness and a section with thinner sheet thickness, the transition sections preferably having a ramp-like profile. The design of one or more of the formed parts with variable sheet thickness over the length is advantageous, as it is possible to dispense with the separate reinforcing elements in the housing assembly that would otherwise be necessary.

According to an embodiment, the reinforcing sections of the respective formed part may be provided in a region where two adjacent battery modules are to be accommodated into the formed part adjacent to each other. This ensures an efficient use of installation space. Reinforcement sections can be provided in the formed parts of the tray arrangement and/or the formed parts of the cover arrangement. Where two or more formed parts are arranged parallel to each other, it is favourable for good force transmission if at least one reinforcing section of a first formed part and one reinforcing section of a second formed part are aligned with each other. However, the reinforcing sections can also be arranged offset to each other.

The joining, i.e. connecting. area can in particular be designed in the form of a longitudinal web which connects the two formed parts. This means that a separate longitudinal web can be advantageously dispensed with, which has a positive effect on production and assembly costs. The first and the second formed part can be joined together in the joining region by a butt joint, overlapping joint, and/or by means of a reinforcing element. Preferably the first part and the second part are welded together in the joining region, whereby other joining methods such as screwing and/or gluing are also possible. For simple and cost-effective production, at least some of the formed parts of the tray arrangement are identical in design. This also applies, preferably, to the formed parts of the cover arrangement, wherein at least two of which may have the same design.

The tray arrangement and the cover arrangement can be made of the same or different material. For example, it may be provided that one of the assemblies, i.e., the tray or cover arrangement, is made of sheet steel while the other, i.e., the cover or tray arrangement, is made of a different material. The other material may, for example, be another steel material, another metallic material such as aluminium or aluminium alloy, or a non-metallic material, in particular a fibre-reinforced plastic.

The housing assembly may be configured such that only the tray arrangement has formed parts of variable sheet thickness or only the cover arrangement has formed parts of variable sheet thickness, or both the tray arrangement and the cover arrangement, have formed parts of variable sheet thickness. When the tray arrangement and the cover arrangement are both comprised of interconnected first and second or more formed parts, it is favourable for achieving a high rigidity when the formed parts of the tray arrangement have a variable thickness in a first direction and the formed parts of the cover arrangement have a variable thickness in a second direction transverse thereto. For example, it may be provided that the formed parts of the tray arrangement have a variable sheet thickness in the longitudinal direction of the assembly, and motor vehicle respectively, and that the formed parts of the cover arrangement have a variable sheet thickness in the transverse direction of the assembly, respectively of the motor vehicle.

A solution further comprises a method of producing a housing assembly comprising a tray arrangement and a cover arrangement for receiving electrical storage means for a drive of an electrically drivable motor vehicle, wherein at least one formed part of the housing assembly is manufactured by the steps: flexible rolling of a steel strip to produce a variable thickness over the length; separating the flexibly rolled steel strip into sheet blanks; forming a sheet blank into a formed part having a bottom and side walls, wherein the formed part has at least one section of greater sheet thickness extending transversely to the longitudinal extent of the formed part. In particular it is provided that at least one of the tray arrangement and the cover arrangement is produced by: flexible rolling of a steel strip, separating of the flexibly rolled steel strip into sheet metal blanks, in any order joining and forming a first and second sheet metal blank so as to form an arrangement with a first and second formed part joined to each other in longitudinal direction, wherein the first and second formed part each have a base and side walls and at least one section of greater sheet thickness extending transversely to the longitudinal extension of the respective formed part.

With the above-mentioned process, housing assemblies can be produced in an advantageous way, which are adapted to the load requirements with regard to their material thicknesses. By making better use of the material used, the housing assemblies can withstand the same or higher loads as housings constructed in a box-like manner with separate stiffeners, whereby the weight and thus the manufacturing and operating costs can be reduced. All of the above features mentioned in connection with the product shall also apply equally to the process, in particular with regard to the thickness profiles of the components, and vice versa, from the process also to the product. It is to be understood that further production steps can be upstream, intermediate or downstream. In particular, several individual sheet blanks can be welded together before or after forming, in order to form a larger tray or cover arrangement, respectively.

With flexible rolling, strip material with essentially uniform sheet thickness is rolled out over its length by changing the roll gap during the process to strip material with variable sheet thickness. The sections of different thicknesses produced by flexible rolling extend transversely to the longitudinal direction, i.e., rolling direction of the strip material. After flexible rolling, the strip material can be easily wound to a coil and used for further processing elsewhere, or it can be processed directly, for example by cutting the strip material into individual sheet elements. Sheet blanks made from flexibly rolled strip material are also referred to as Tailor Rolled Blanks.

The flexibly rolled strip material can be separated into sheet blanks by punching or cutting. In the simplest case, the separation step can be a cutting of the strip material into blank sheets.

The forming of the sheet metal blank or of a composite blank formed from several joined sheet metal blanks can include, for example, pressing, press forming and/or deep drawing.

In order to achieve a particularly high strength, a steel strip made of a hardenable steel material, in particular a manganese-boron alloyed steel material, can be used as the starting material, whereby the forming of the sheet blank into a formed part is preferably carried out by hot forming. Hot forming comprises the following steps: heating of the sheet blank to austenitizing temperature, subsequent forming of the heated sheet blank in a hot forming tool and rapid cooling to produce a hardened formed part. More specifically, heating takes place in such a way that at least a partial, preferably completely austenitic microstructure is present (austenitisation temperature). The heated workpiece is then placed in a hot forming tool, where it is formed and cooled in such a way that a hardened, martensitic microstructure is obtained. This process is also known as press hardening.

Hot forming can be carried out after a first possibility as an indirect process, which comprises the partial steps of cold preforming, subsequent heating of the cold preformed component to austenitisation temperature and subsequent hot forming to produce the final contour of the product. Hot forming can also be carried out as a direct process, which is characterized by heating the component directly to austenitization temperature and then hot forming it to the desired final contour in a single step. A previous (cold) preforming does not take place here.

The steps of joining and forming the sheet metal blanks can be carried out in any sequence, i.e., first joining the blanks to form a blanks composite and then forming the joined blanks composite to form the arrangement, or first forming the individual blanks to form the formed parts and then joining the formed parts so as to form the arrangement. More specifically, a further step can be provided: connecting a first sheet blank and a second sheet blank arranged adjacent thereto to form a blank composite, wherein a longitudinally extending joining region is formed between the first sheet blank and the second sheet blank; and forming the blank composite in a forming tool such that the first sheet blank is formed into a first formed part and the second sheet blank is formed into a second formed part, wherein the joining region is arranged between the two formed parts after forming.

Exemplary embodiments are explained below on the basis of the drawing figures, which show.

The FIGS. 1A to 1G, which are described together in the following, show an example housing assembly 2, in which electrical storage means 3 can be accommodated, in a first embodiment. Such a housing assembly 2 can be connected to the body of a motor vehicle. The electrical storage means 3 serve to store electrical energy, which can be used to supply an electric motor of the electrically driven motor vehicle with electricity. They can also be referred to as electrical energy storage device, accumulator, or battery (module).

The housing assembly 2 has a tray arrangement 4 and a cover arrangement 5, which can be detachably connected to each other, for example by means of screw connections (not shown). The housing assembly 2 in the present embodiment has a relatively flat structure, whereby it is understood that other housing forms are also possible depending on the size, shape and number of electrical storage media to be accommodated. The length L2 and/or the width B2 of the housing assembly 2 can be many times greater than its mean height H2, in particular greater than four times the mean height H2 (L2>4H2 and/or B2>4H2), and possibly also greater than eight times the mean height H2 (L2>8H2 and/or B2>8H2). The tray arrangement 4 can also be referred to as the lower housing shell and the cover arrangement 5 also as the upper housing shell.

The electrical energy storage modules can be placed onto, i.e. inserted into the tray arrangement 4 and fixed thereto. Subsequently, the cover arrangement 5 can be placed on the tray arrangement 4 and releasably connected thereto. In the present embodiment, the tray arrangement 4 comprises a first formed part 6 and a second formed part 7, which are firmly connected to each other, in particular joined with each other, for example by welding. The two formed parts 6 and 7 have the same design, although it is understood that they can also be designed differently. As can be seen especially in FIGS. 1C and 1D, the two formed parts 6 and 7 are tray-shaped and each comprise a base 19 and a circumferential side wall 20, which are formed in one piece, i.e., integrally. The two formed parts 6, 7 are arranged next to each other and connected over their length L4. The length L6, L7 of the formed parts 6, 7 is greater than their respective width B6, B7, without being restricted thereto. The housing assembly 2 may be installed in the motor vehicle in such a way that the longitudinal direction x of the housing is parallel to the longitudinal direction of the motor vehicle.

Figure 1A:
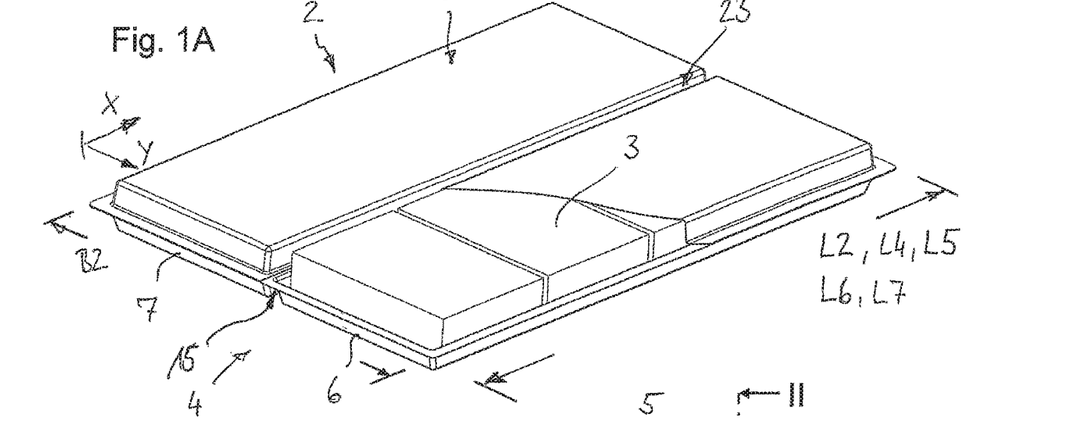
FIG. 1A: an example housing assembly for accommodating electrical storage means in a first embodiment in a perspective view, partially cut.
Figure 1B:
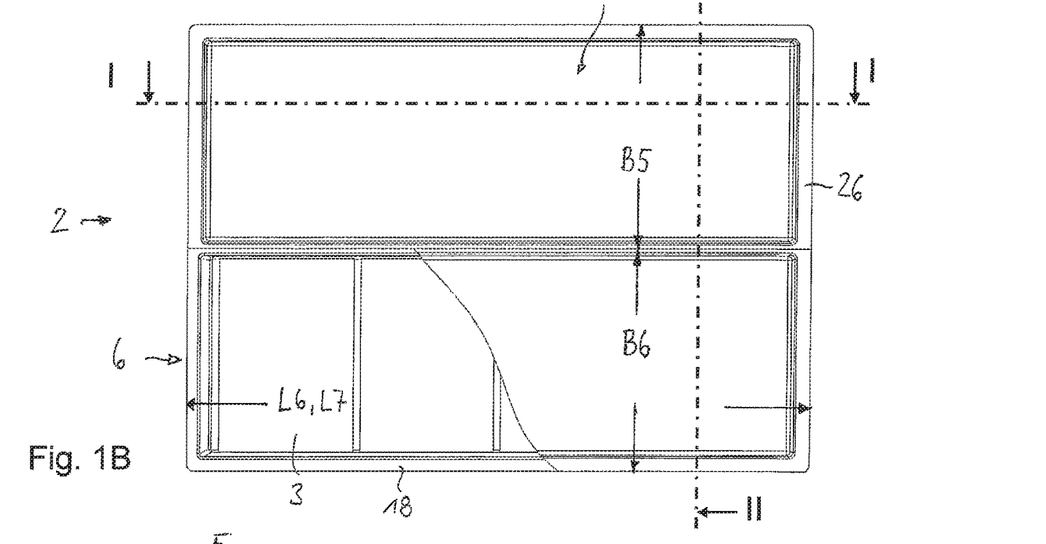
FIG. 1B: the housing assembly of FIG. 1A in plan view.
Figure 1C:
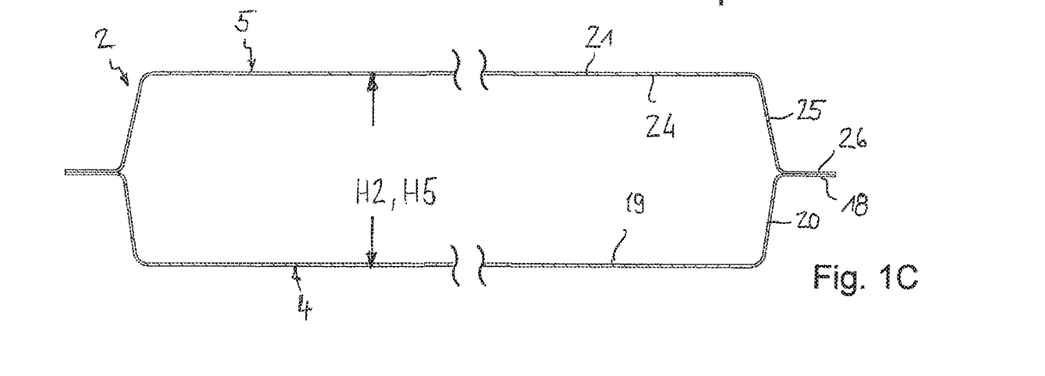
FIG. 1C: the housing assembly according to section line I-I of FIG. 1B.
Figures 1D, 1E, 1F:
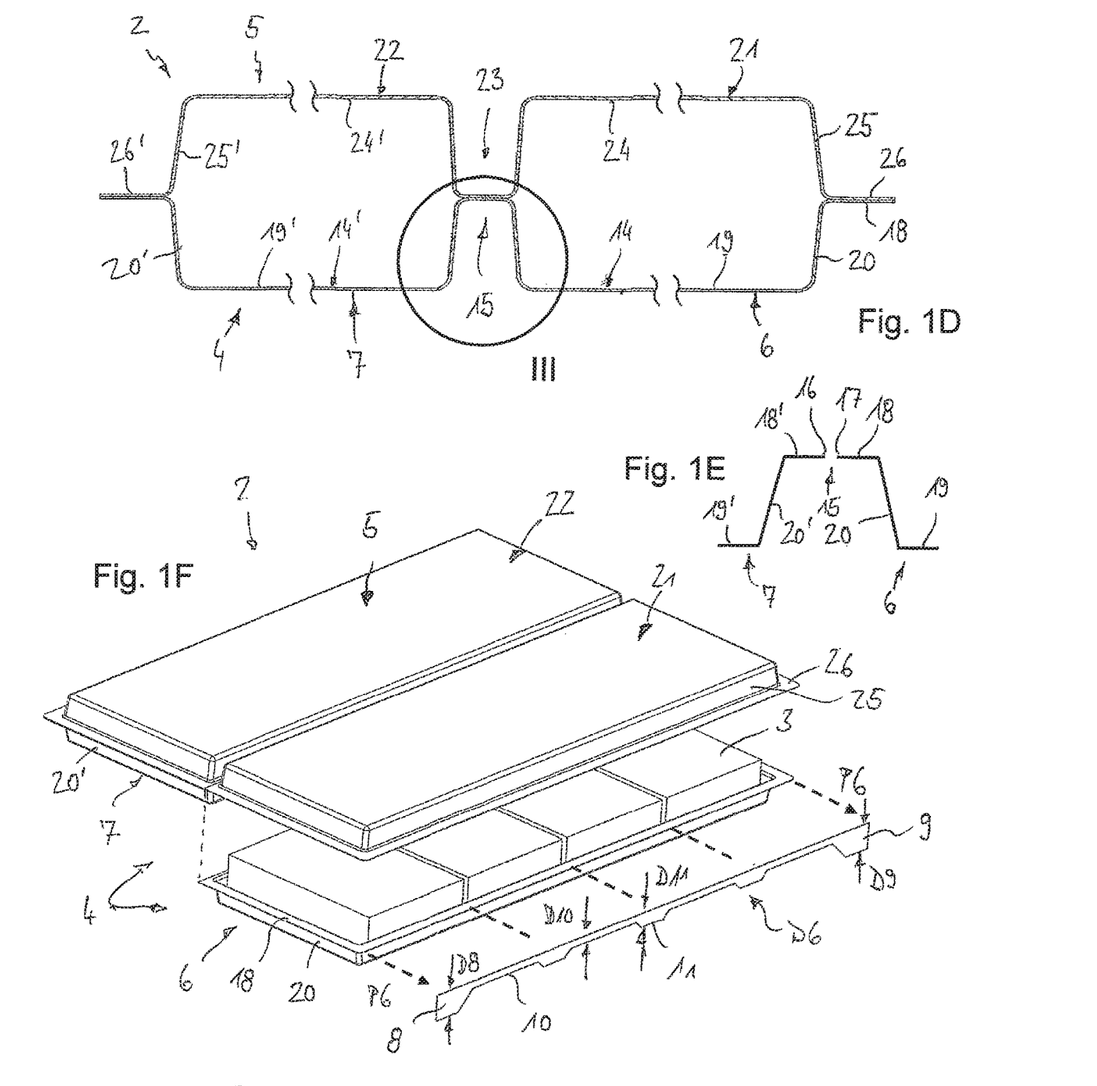
FIG. 1D: the housing assembly according to section line II-II of FIG. 1B.
FIG. 1E: the detail III from FIG. 1D as detail.
FIG. 1F: the housing assembly from FIG. 1A in perspective exploded view with the material thickness drawn in over the length of a tray formed part.

The first and the second formed part 6, 7 are each made of flexibly rolled steel sheet so that they have a variable sheet thickness D6 over the length of the respective formed part 6, 7. A projection of the side surface of tray part 5 is shown in FIG. 1F at the end of arrows P6 and in FIG. 1G as a detail. If the two parts are of the same design, the details described for one of the parts 6, 7 also apply to the other (7, 6). It can be seen that the tray part 6 has thickened end sections 8, 9. Due to the greater sheet thickness D8, D9 in the end sections 8, 9, the tray parts 6, 7 have a high strength here, so that high forces can be absorbed and supported. The end sections 8, 9 have a thickness D8, D9 preferably from 1.0 mm to 3.5 mm, and a length L8, L9 preferably from 20 mm to 200 mm.

Between the end sections 8, 9 thinner sections 10 and thicker reinforcement sections 11 are formed, which are arranged alternately. Between the thickened end sections 8, 9 and the adjacent thinner sections 10, as well as between the thinner sections 10 and the adjacent reinforcing sections 11, transition sections 12, 13 with continuously variable sheet thickness are formed. The tray parts 6, 7 are designed in such a way that they have a flat surface 14 on which the battery modules 3 rest, i.e., the change in sheet thickness D is directed outwards. The reinforcing sections 11 have a thickness D11 which is smaller than the thickness D8, D9 of the end sections D8, D9, and larger than the thickness D10 of the thinner sections 10. The thinner sections 10 can have a sheet thickness of 0.5 mm to 1.5 mm, for example 1.0 mm. The reinforcement sections 11, for example, can have a thickness D11 of 1.0 mm to 3.5 mm.

Figure 1G:
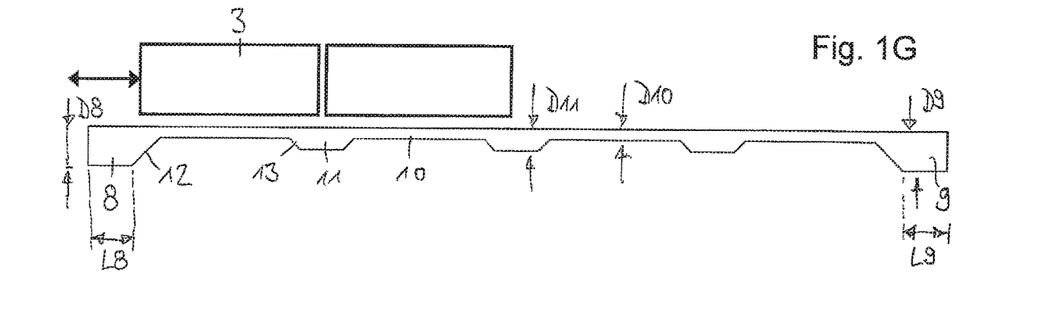
FIG. 1G: the profile of the material thickness of the tray formed part from FIG. 1F.

As shown especially in FIG. 1G, the reinforcing sections 11 are arranged in an adjacent area between two battery modules 3 to be inserted adjacent to each other in the tray part 6, 7. A stiffening function is thus achieved in these adjacent areas between two battery modules 3, so that the housing assembly 2 with batteries 3 inserted in it has a high overall stiffness. The thickened end sections 8, 9, each connected to the last battery module 3, each serve as energy absorption sections (shown with an arrow in FIG. 1G).

The two tray parts 6, 7 are welded together along their inner longitudinal edges 16, 17 in a connection region 15 running in longitudinal direction x, which can also be referred to as joining region. The longitudinal direction x at least substantially corresponds to the direction of the longest length of the first tray part 6, and second tray part 7, respectively. The longitudinal edges 16, 17 in the connection region form side edges of a circumferential flange portion 18, 18' of the respective tray part 6, 7. In the present embodiment, the longitudinal edges 16, 17 of the two tray parts 6, 7 are welded together in a butt joint, as schematically shown in FIG. 1E. It is to be understood that other designs of the connection are also possible, which will be explained in greater detail below. The joining region in the present embodiment extends in longitudinal direction between the two formed parts 6, 7 and thus forms a longitudinal web with a respective reinforcement function in longitudinal direction.

The cover arrangement 4 is similar in design to the tray arrangement 3 and comprises a first formed part 21 and a second formed part 22, which are firmly connected to each other in the connection region 23. The two formed parts 21 and 22 have the same design, although it goes without saying that they can also be designed differently from each other. Furthermore, the cover arrangement may also be made of one part. As can be seen in particular in FIGS. 1C and 1D, the two formed parts 21 and 22 are tray-shaped and comprise a base 24 and a circumferential side wall 25 as well as a circumferential flange portion 26, which are formed in one piece. The two formed parts 21, 22 are arranged next to each other and connected over their length L5.

In the present embodiment, the two formed parts 21, 22, which can also be referred to as cover parts, are made of sheet steel with a constant sheet thickness D21, D22, without being restricted to this. For example, the cover arrangement 5—like the tray arrangement—can also be made of sheet metal of variable thickness or of another material, such as light metal or plastic, in particular fibre-reinforced plastic. The material thickness of the cover parts 21, 22 is designed according to the required strength and crash properties.

After inserting the battery modules 3, the tray arrangement 4 and the cover arrangement 5 are firmly connected to each other. This can be done, for example, by means of screw connections (not shown) with which the flange portions 18, 26 of the formed parts 6, 21; 7, 22 being positioned on each other are connected to each other. In particular, it is provided that the joint between the tray arrangement 4 and the cover arrangement 5 is sealed to the outside by means of suitable sealing means, for example a circumferential sealing ring or adhesive sealing compound. The housing assembly 2, thus including the tray arrangement 4 and cover arrangement 5, forms a self-contained, sealed and self-supporting structure with high rigidity and strength.

Figure 2A:
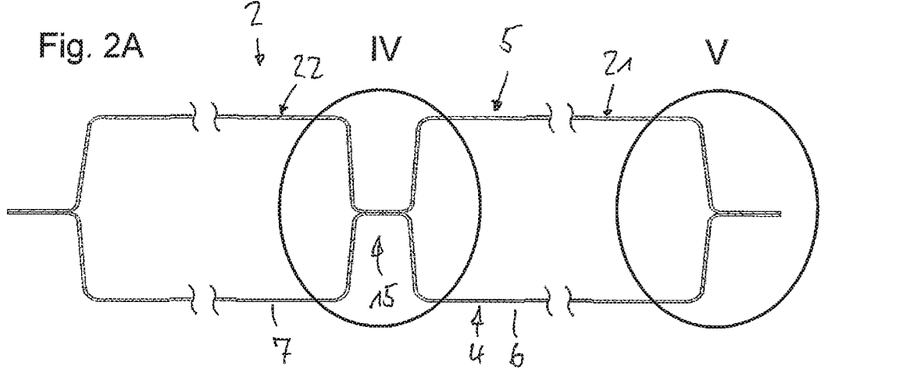
FIG. 2A: an example housing assembly for accommodating electrical storage means in a modified second embodiment in a cross-section.
Figure 2B:
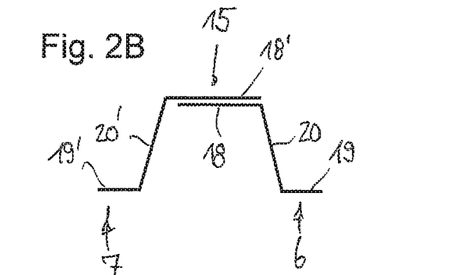
FIG. 2B: the detail IV from FIG. 2A as detail.
Figure 2C:
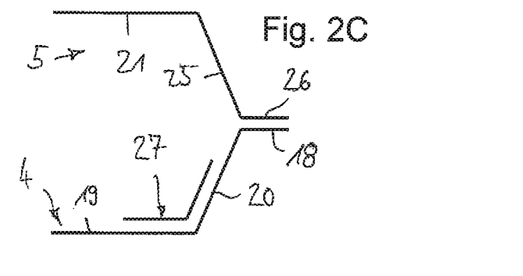
FIG. 2C: the detail V from FIG. 2A as detail.

FIGS. 2A to 2C show a housing assembly 2 according to a further embodiment. This largely corresponds with the embodiment according to FIGS. 1A to 1G, so that reference is made to the above description with regard to the similarities. The same, respectively corresponding components are provided with the same reference signs as in FIG. 1.

A first difference is the design of connection 15 between the first tray part 6 and the second tray part 7. As shown in FIG. 2B as the detail IV of FIG. 2A, the flange portion 18 of the first tray part 6 and the flange portion 18' of the second tray part 7 are designed to overlap each other in the connection area 15. In this way, the material thickness is doubled so that a higher overall strength and rigidity is achieved in the longitudinal direction of arrangement 2.

A further difference is that the tray parts 6, 7 each have reinforcing plates 27 welded in along their outer side walls 20, which preferably extend over the entire length of the tray portions and thus also provide increased strength and rigidity, respectively.

Figures 3A, 3B, 3C:
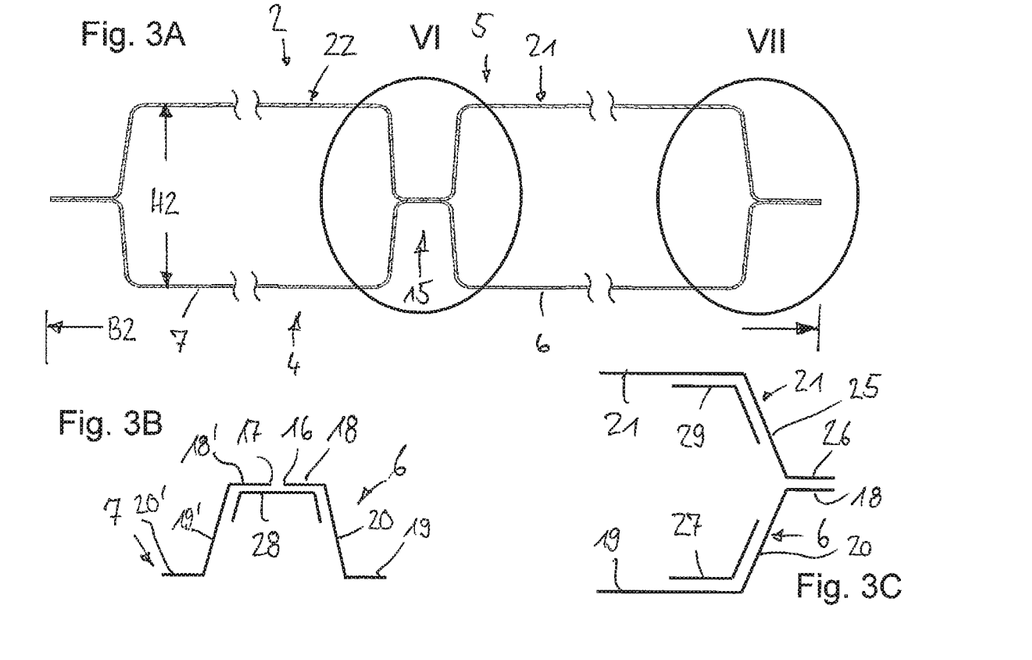
FIG. 3A: a housing assembly in accordance with the invention for accommodating electrical storage means in a modified further embodiment in a cross-section.
FIG. 3B: the detail VI from FIG. 3A as detail.
FIG. 3C: the detail VII from FIG. 3A as detail.

FIGS. 3A to 3C show a housing assembly 2 according to an embodiment of a further design. This largely corresponds to the embodiment according to FIGS. 1A to 1G, so that reference is made to the above description with regard to the similarities. The same, respectively corresponding components are provided with the same reference signs as in FIG. 1.

A difference is the design of the connecting region 15 between the first tray and the second tray part 7. As can be seen in FIG. 3B as the detail VI of FIG. 3A, the flange portion 18 of the first tray portion 6 and the flange portion 18' of the second tray portion 7 are placed against each other with their edges 16, 17 and connected to each other by means of a reinforcing element 28, also called patch. The connection can, for example, be made by welding in the area of the flanges 18, 19 with the reinforcing element 28. In this way, the material thickness in the joint area 15 is doubled, so that a higher overall strength and rigidity is achieved in the longitudinal direction of arrangement 2.

Another specific feature of the present embodiment is that both the tray parts 6, 7—as in the embodiment according to FIG. 2—and the cover parts 21, 22 each have reinforcing plates 27, 29 welded in along their outer side walls 20, 25 which plates preferably extend over the entire length of the tray-shaped formed portions and thus also provide increased strength and rigidity in the longitudinal direction.

It is to be understood that these embodiments are only exemplary and further variations are conceivable. For example, it is also possible to have a connection arrangement with a butt joint of the tray parts 6, 7 as shown in FIG. 1, with a stiffening of the edge area of the tray and/or the cover as shown in FIG. 2C or 3C, respectively. A connection 15, as shown in FIG. 2B or 3B, is also possible without further stiffening in the edge area of the tray or cover.

Figures 4A, 4B, 4C:
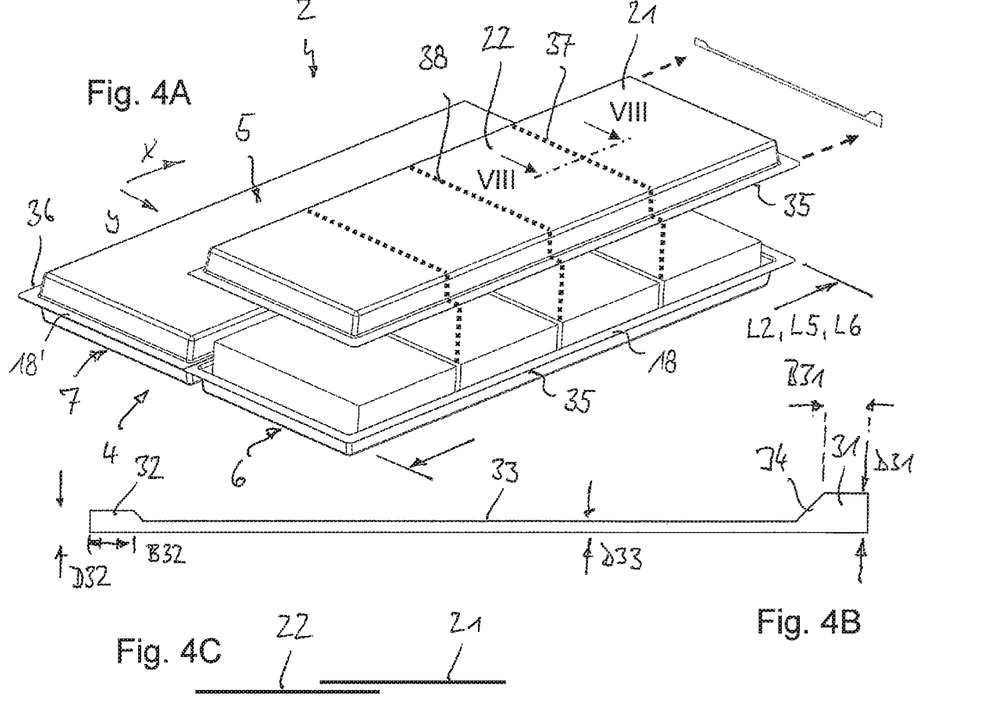
FIG. 4A: an example housing assembly for accommodating electrical storage means in a further embodiment in a perspective view, in partial explosion representation.
FIG. 4B: the profile of the material thickness of the cover part from FIG. 4A.
FIG. 4C: the section VIII-VIII from FIG. 4A as detail.

FIGS. 4A to 4C show a housing assembly 2 according to a further embodiment. This largely corresponds to the embodiment according to FIGS. 1A to 1G, so that reference is made to the above description with regard to the similarities. The same, respectively corresponding components are provided with the same reference signs as in FIG. 1.

The design of tray arrangement 4 corresponds to the tray arrangement shown in FIG. 1, so that reference is made to the above description of FIG. 1 in order to avoid repetitions.

In the present embodiment according to FIGS. 4A to 4C, the cover arrangement 5 also comprises formed parts 21, 22 made of flexibly rolled strip material. A special feature is that the formed parts 21, 22 have a variable sheet thickness in the transverse direction y of the housing assembly 2, in particular perpendicular to the variable thickness profile of the tray arrangement 4. The formed parts 21, 22 extend over the entire width B of the housing assembly 2, i.e., from one outer edge 35 to the other outer edge 36.

The sheet blanks from which the formed parts 21, 22 are made are identical in design in the present embodiment, but can also have different sheet thickness profiles. In as far the two formed parts 21, 22 are of the same design, the details described for one formed part 21 also apply for the other formed part 22. FIG. 4A shows that formed part 21 has a variable sheet thickness D21 over the length of the formed part 21. A projection of the side surface of formed part 21, which can also be referred to as a cover part, is shown in FIG. 4A at the end of the arrows and in FIG. 4B as a detail. It can be seen that the cover part 21 has thickened end sections 31, 32. Due to the greater sheet thickness D31, D32 in the end sections 31, 32, the cover parts 21, 22 have a high strength, so that high lateral forces can be absorbed and supported. The thickness profile can be individually configured according to the requirements in terms of strength and stiffness. In the present embodiment, the laterally outer end section 31 has a greater thickness D31 than the inner section 32, which is connected to the adjacent cover part 22. The thickness of the end sections 31, 32 can be between 1.0 mm and 3.5 mm, the width B31, B32 can be between 20 mm and 200 mm, for example. Between the end sections 31, 32 a thinner section 33 is provided, which can have a thickness of for example 0.5 mm to 1.5 mm. Between the thickened end sections 31, 32 and the thinner section 33 there are transition sections 34 with continuously variable sheet thickness.

It can also be seen in FIG. 4C that two adjacent cover parts 21, 22 are joined overlapping, in particular by welding. Due to the overlapping connection an increased stiffness in transverse direction y of the housing assembly 2 is achieved. The joining regions 37, 38 of the parallel sheet metal blanks from which the cover parts 21, 22 are made are preferably arranged in such a way that in the joined state they are arranged in the area of two adjacent battery modules 3.

Figure 5:
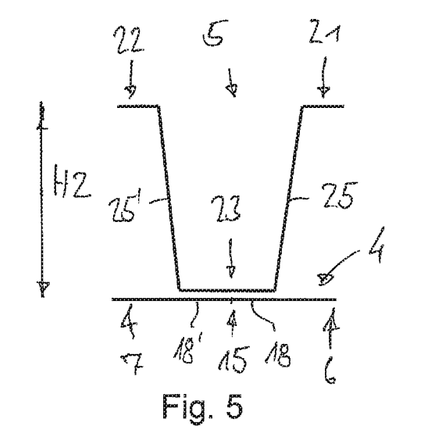
FIG. 5: the connection region of a housing assembly in a further embodiment in a cross-section.
Figure 6:
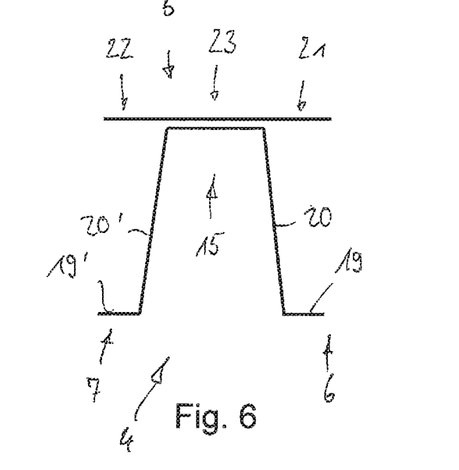
FIG. 6: the connection region of a housing assembly in a further embodiment in a cross-section.

All the embodiments described above have in common that both the tray part 4 and the cover part 5 are tray-shaped, with a bottom 19, respectively upper bottom 24, and a circumferential wall section 20, 25, respectively. According to a modified embodiment shown in FIG. 5, it is also possible that the tray arrangement 4 is flat in the connection area 15 and the tray shape of the cover 5 extends over the entire height H2. According to an inverted design, shown in FIG. 6, it is also possible that the cover arrangement 5 is flat in the connection area 23 and the tray shape of the tray 4 extends over the entire height H2.

Figure 7:
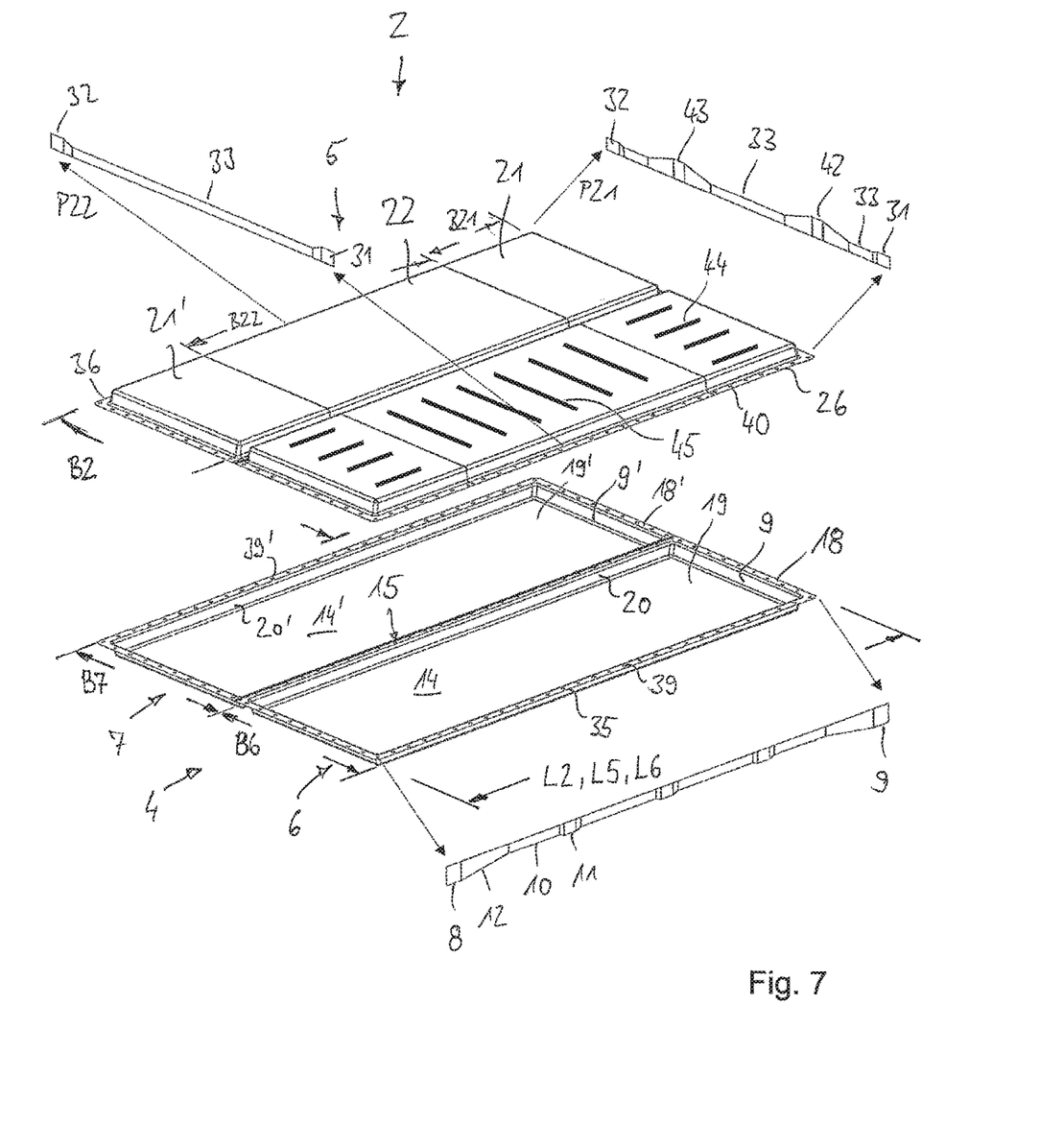
FIG. 7: a housing assembly for accommodating electrical storage means according to the invention in a further embodiment with a tray arrangement with a variable thickness over the length.

FIG. 7 shows a housing assembly 2 in a further embodiment. This corresponds largely to the embodiment according to FIGS. 1A to 1G, and to the embodiment according to FIGS. 4A to 4C, respectively to whose description reference is made with regard to the similarities. The same and/or corresponding components are provided with the same reference signs as in the figures above.

In the present embodiment according to FIG. 7, the design of the tray arrangement 4 corresponds to that of FIG. 1, to which reference is made for avoiding repetitions. In the flange portion 18 of the tray arrangement 4 through-holes 39 distributed over the circumference are visible for the screw connections. The cover arrangement 5 has corresponding holes 40 through which suitable screws can be inserted and tightened. A row with holes is also provided in the connection area 15, 23 for screwing the tray and cover arrangement 4, 5.

The cover arrangement 5 is made of several sheet blanks of flexibly rolled strip material. The laterally arranged formed parts 21, 21' have a first sheet thickness profile, the projection of which can be seen at the end of the arrows P21. The formed part 22 located between the lateral formed parts 21, 21' has a second sheet thickness profile, the projection of which can be seen at the end of the arrows P22. All formed parts 21, 22 of the cover 5 have a variable sheet thickness in the transverse direction y of housing assembly 2, i.e., perpendicular to the variable thickness profile of tray arrangement 4. The formed parts 21, 22 each extend over the entire width B2 of housing assembly 2, i.e. from one outer edge 35 to the other outer edge 36.

The sheet blanks from which the lateral formed parts 21, 21' are made are identical in design, but can also have different sheet thickness profiles. It can be seen that the cover part 21 has thickened end sections 31, 32, that are followed by thinner intermediate sections 33 in the direction towards the connecting region 23, wherein a thickened section 42, 43 is provided in the central area of a respective tray-shaped recess. Between the two thickenings 42, 43 there is again a central section 33 with small sheet thickness D33, which is connected in assembled condition with the connecting section 15 of the tray arrangement 4. The thickened ends 31, 32 provide increased strength against lateral impact forces. The central thickenings 42, 43 increase the load capacity in longitudinal direction x of the housing assembly 2.

The thickness profile of the sheet metal blank from which the middle cover part 22 is made is similar to that of the embodiment shown in FIG. 4. The end sections 31, 32 are thickened, whereby the thickness here can be configured, in particular, as for the end sections of the lateral blanks 21, 21'. Between the end sections 31, 32 an intermediate section 33 with a constant lower sheet thickness D33 is provided. It can also be seen that the width B22 of the central blank 22 is greater than the width B21, B21' of the lateral blanks 21, 21'. The adjacent blanks 21, 22; 22, 21' can be joined together in a butt joint or overlapping. One or more of the formed parts 21, 22, 21' may be provided with reinforcing beads 44, 45, 44'.

Figure 8:
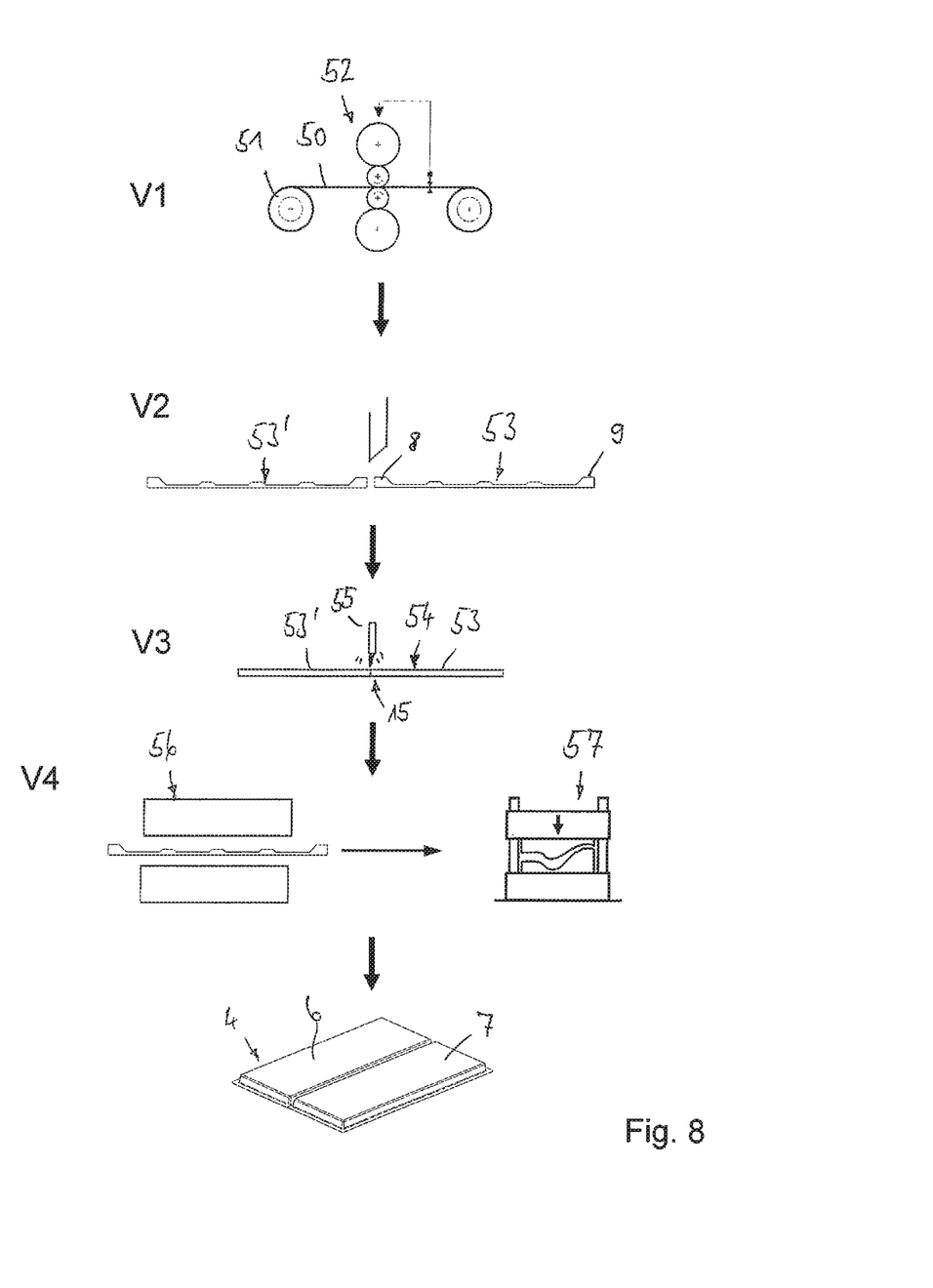
FIG. 8: a method of producing a tray arrangement and/or cover arrangement in an embodiment.

FIG. 8 shows an example of a method for producing a tray and/or cover section 4, 5 for a housing assembly 2 according to a possible embodiment.

In process step V1, the strip material 50, which is initially wound to a coil 51, is rolled by means of flexible rolling. For this purpose, the strip material 50, which has a substantially constant sheet thickness over its length before flexible rolling, is rolled by means of rolls 52 in such a way that it obtains a variable sheet thickness along the rolling direction. During rolling, the process is monitored and controlled, using the data obtained from a sheet thickness measurement as an input signal for controlling the rolls 52. After flexible rolling, the strip material 50 has sections with different thicknesses, each extending transversely to the rolling direction. After flexible rolling, the strip material is wound back to a coil so that it can be fed to the next process step.

In process step V2, the flexibly rolled steel strip is separated into sheet blanks 53, 53'.

In a subsequent process step V3, two sheet blanks 53, 53' are joined together to form a blanks composite 54, in particular by welding. The joining takes place along the longest length of the 53, 53' blanks, i.e. across to the individual thick and thin sections of the blanks.

In a subsequent process step V4, the blank compound 54 is formed by hot forming. Hot forming comprises the following steps: heating in a furnace 56, transfer to the hot forming tool 57, where the blanks 54 are formed and hardened into a tray arrangement 4 or cover arrangement 5, respectively.

REFERENCE CHARACTER LIST 2 housing assembly
3 storage means
3 tray arrangement
4 cover arrangement
5 first formed part
6 second formed part
7 end section
8 end section
9 thinner section
10 reinforcement section
11 transition section
12 transition section
13 surface
14 connection region
15 longitudinal edge
16 longitudinal edge
18, 18' flange portion
19 base
20 sidewall
21 first formed part
22, 22' second formed part
23 connection region
24 base
25, 25' sidewall
26 flange portion
27 reinforcing plate
28 reinforcing element
29 reinforcing plate
31 end section
32 end section
33
34 transition section
35 outer edge
36 outer edge
37 joint
38 joint
39 through-opening
40 through-opening
41
42 thickening
43 thickening
44 stiffening bead
45 stiffening bead
B width
D thickness
H height
L length
P arrow
V process step
x longitudinal direction
y transverse direction

The invention claimed is:

1. A housing assembly for receiving electric storage means for a drive of an electrically drivable motor vehicle, comprising:
a tray arrangement for receiving the electric storage means, and
a cover arrangement which is releasably connectable to the tray arrangement,
wherein at least one of the tray arrangement and the cover arrangement comprises a first formed part and a second formed part each having a bottom and side walls;
wherein the first formed part and the second formed part are each made of flexibly rolled metallic material and have a variable sheet thickness in a longitudinal direction of the respective formed part, with a length of the respective formed part in the longitudinal direction being greater than a width perpendicular thereto,
wherein the first formed part and the second formed part are arranged adjacent to each other and joined with each other along a joining region extending in the longitudinal direction,
wherein end sections of the first formed part have a greater sheet thickness than at least one first intermediate section of the first formed part arranged therebetween, and
wherein end sections of the second formed part have a greater sheet thickness than at least one second intermediate section of the second formed part arranged therebetween.

2. The housing assembly according to claim 1,
wherein the first formed part and the second formed part are produced from a hardenable steel material, and are hardened.

3. The housing assembly according to claim 1,
wherein the first formed part has, between the end sections, at least one first reinforcing section which has a greater sheet thickness than the first intermediate section, or
wherein the second formed part has, between the end sections, at least one second reinforcing section which has a greater sheet thickness than the second intermediate section.

4. The housing assembly according to claim 3,
wherein a first reinforcing section of the first formed part and a second reinforcing section of the second formed part extend transversely to the longitudinal extension of the first and second formed parts and are aligned with one another.

5. The housing assembly according to claim 3,
wherein the at least one first reinforcing section of the first formed part is provided in a first region in which two battery modules to be inserted into the first formed part are arranged adjacent to each other, or
wherein the at least one second reinforcing section of the second formed part is provided in a second region, in which two battery modules to be inserted into the second formed part are arranged adjacent to each other.

6. The housing assembly according to claim 1,
wherein the first formed part and the second formed part are connected to one another in the joining region by at least one of one of a butt joint, anover-lapping joint, and a reinforcing element.

7. The housing assembly according to claim 1,
wherein the first formed part and the second formed part are welded together in the joining region.

8. The housing assembly according to claim 1,
wherein the first formed part and the second formed part are identically formed.

9. The housing assembly according to claim 1,
wherein the tray arrangement and the cover arrangement each comprise a first formed part and a second formed part connected thereto, at least a part of which is produced from flexibly rolled steel sheet, and
wherein the first and second formed parts of the tray arrangement have a variable thickness in a first direction, and the first and second formed parts of the cover arrangement have a variable thickness in a second direction perpendicular to the first direction.

10. The housing assembly according to claim 9,
wherein the first and second formed parts of the tray arrangement have a variable sheet thickness in the longitudinal direction, and
wherein the first and second formed parts of the cover arrangement have a variable sheet thickness in the transverse direction.

11. The housing assembly according to claim 1,
wherein the tray arrangement and the cover arrangement are made of different materials.

12. Method for producing a housing assembly comprising a tray arrangement and a cover arrangement for receiving electrical storage means for a drive of an electrically drivable motor vehicle,
wherein at least one of the tray arrangement and a cover arrangement is produced by:
flexible rolling of a steel strip to produce a variable thickness over a length,
separating of the flexibly rolled steel strip into sheet metal blanks,
in any order joining and forming a first and second sheet metal blank so as to form an arrangement with a first and second formed part joined to each other, wherein the first and second formed part each have a base and side walls and at least one section of greater sheet thickness extending transversely to a longitudinal extension of the respective formed part,
connecting a first sheet metal blank and a second sheet metal blank arranged adjacent thereto to form a composite sheet metal blank, wherein a joining region is formed in a longitudinal direction between the first sheet metal blank and the second sheet metal blank, and
forming the composite sheet metal blank in a forming tool such that the first sheet metal blank is formed to the first formed part and the second sheet metal blank is formed to the second formed part, wherein the joining region is arranged between the two formed parts after the forming.

13. The method according to claim 12,
wherein the steel strip is produced from a hardenable steel material,
wherein the forming of the sheet metal blank into the formed part is effected by hot forming with the partial steps of heating the sheet metal blank to an austenitizing temperature, subsequent forming of the heated sheet metal blank in a hot forming tool and rapid cooling such that a hardened formed part is produced.

* * * * *

UNITED STATES PATENT AND TRADEMARK OFFICE
CERTIFICATE OF CORRECTION

PATENT NO. : 11,091,014 B2
APPLICATION NO. : 16/295119
DATED : August 17, 2021
INVENTOR(S) : Scholemann et al.

Page 1 of 1

It is certified that error appears in the above-identified patent and that said Letters Patent is hereby corrected as shown below:

In the Claims
Column 13, in Line 32, replace "anover-lapping joint," with -- an over-lapping joint --.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*